F. M. FRANCART, G. C. DEBAY, J. W. JOHNSTON & G. B. COUCH.
APPARATUS FOR MAKING SHEET GLASS.
APPLICATION FILED DEC. 1, 1909.
976,125.
Patented Nov. 15, 1910.
4 SHEETS—SHEET 1.
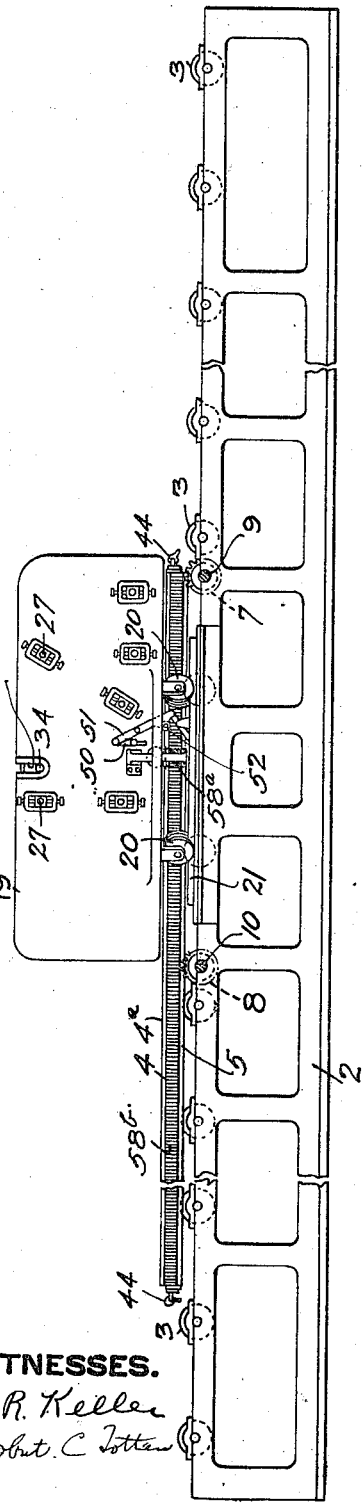
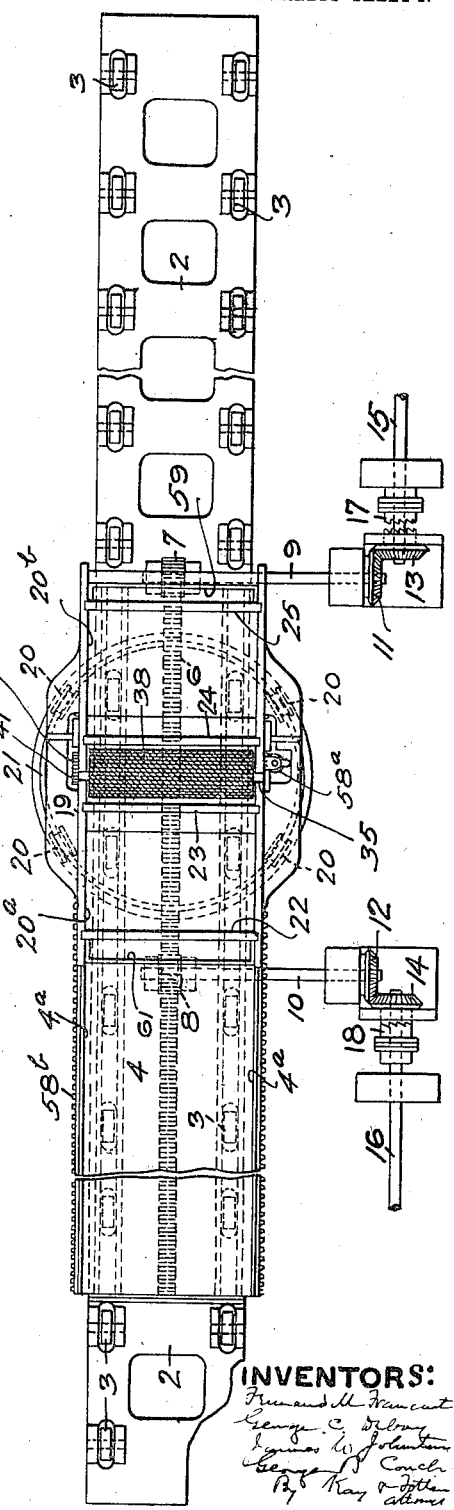
WITNESSES.
INVENTORS:

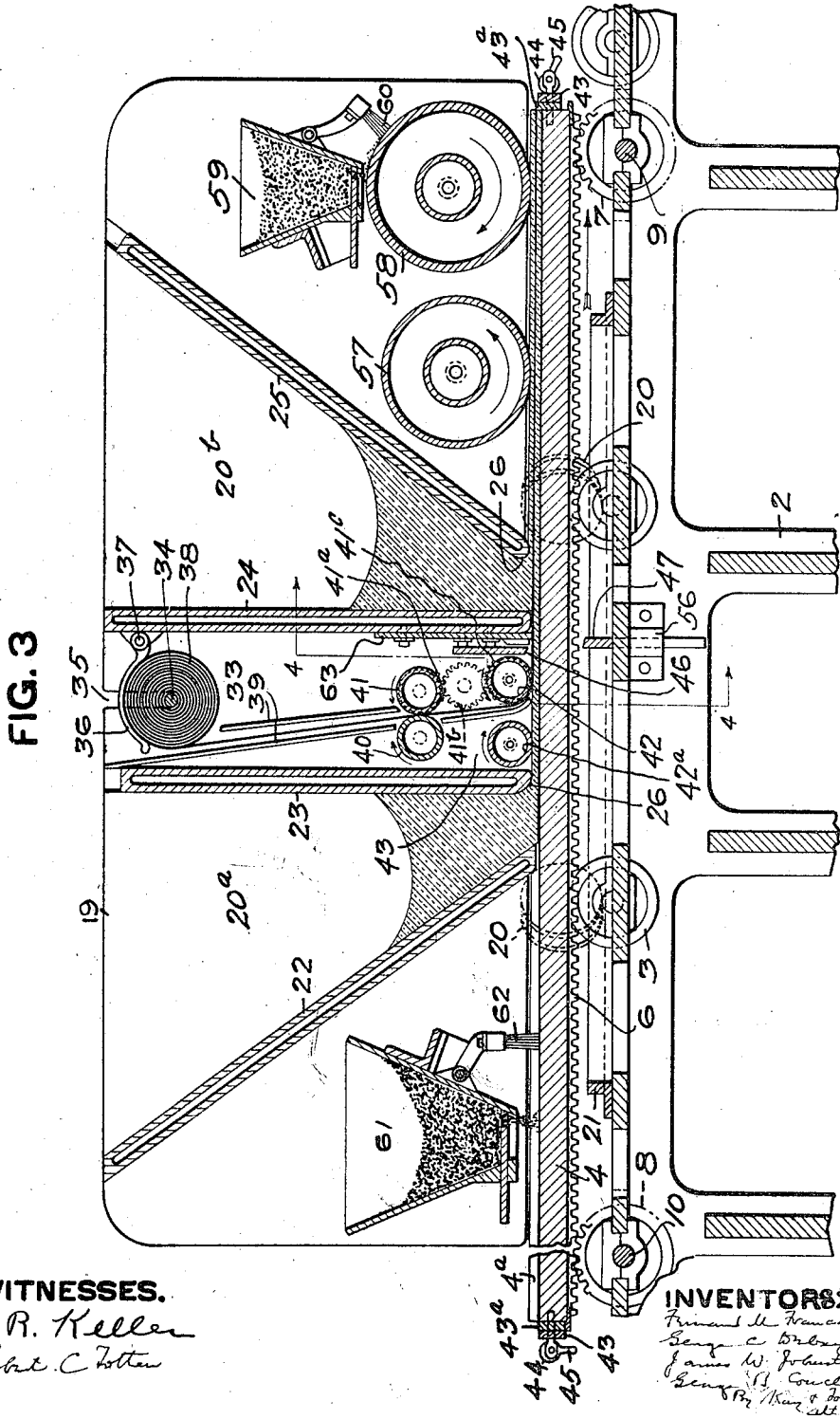

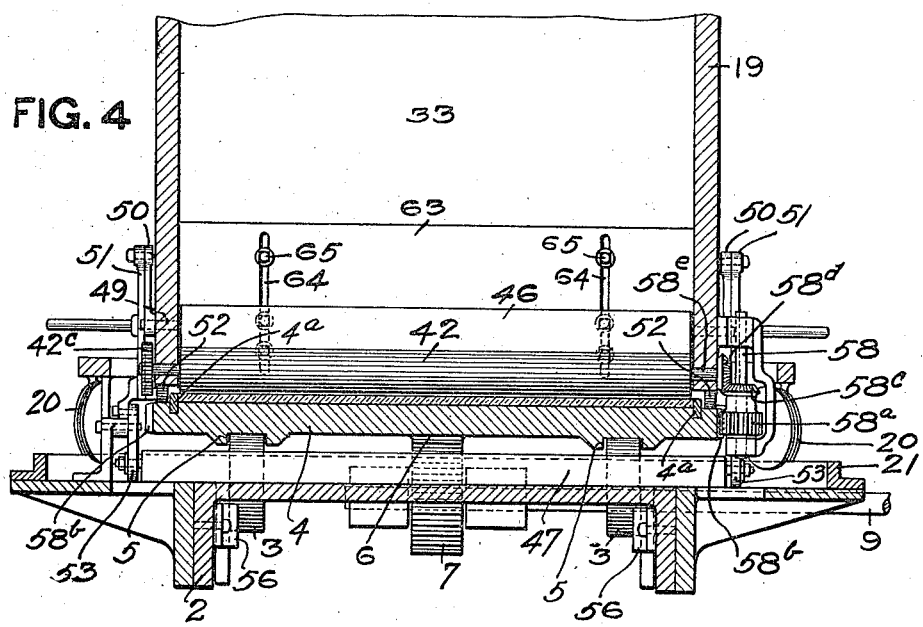
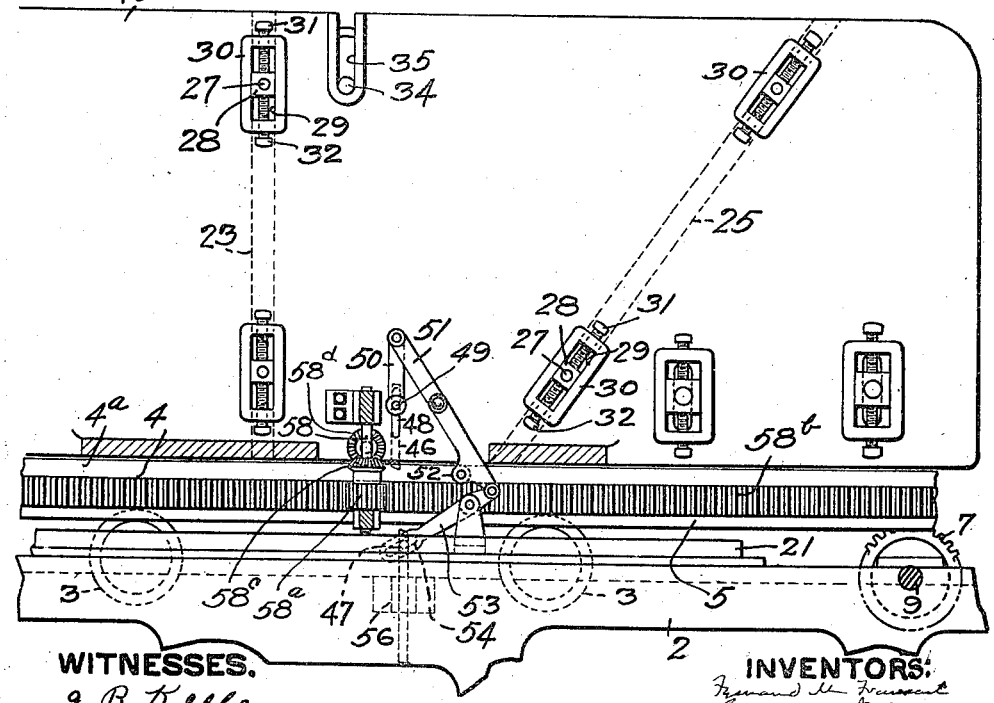

F. M. FRANCART, G. C. DEBAY, J. W. JOHNSTON & G. B. COUCH.
APPARATUS FOR MAKING SHEET GLASS.
APPLICATION FILED DEC. 1, 1909.

976,125.

Patented Nov. 15, 1910.
4 SHEETS—SHEET 4.

WITNESSES.

INVENTORS:

UNITED STATES PATENT OFFICE.

FERNAND M. FRANCART, OF ARNOLD, AND GEORGE C. DEBAY, JAMES W. JOHNSTON, AND GEORGE B. COUCH, OF SPRINGDALE, PENNSYLVANIA.

APPARATUS FOR MAKING SHEET-GLASS.

976,125.  Specification of Letters Patent.  Patented Nov. 15, 1910.

Application filed December 1, 1909. Serial No. 530,873.

*To all whom it may concern:*

Be it known that we, FERNAND M. FRANCART, a resident of Arnold, in the county of Westmoreland and State of Pennsylvania, and GEORGE C. DEBAY, JAMES W. JOHNSTON, and GEORGE B. COUCH, residents of Springdale, county of Allegheny, and State of Pennsylvania, have invented a new and useful Improvement in Apparatus for Making Sheet-Glass; and we do hereby declare the following to be a full, clear, and exact description thereof.

Our invention relates to apparatus for the manufacture of sheets or plates of glass, or wire-glass, which has a wire-mesh embedded in the body of the glass.

The object of our invention is to provide a simple form of apparatus by means of which the glass may be fed to the forming table and spread thereon with an even, uniform distribution to any thickness desired, and to provide for the embedding of the wire-mesh in the glass where wire-glass is to be made so that the wire will have an equal body of glass on each side thereof.

To these ends our invention comprises, generally stated, a suitable table or platform, a suitable receptacle for containing glass, said table and receptacle movable the one with relation to the other, and a non-rotary distributer or leveler, whereby the glass is leveled and distributed by the movement of the table with reference thereto.

Figure 6:
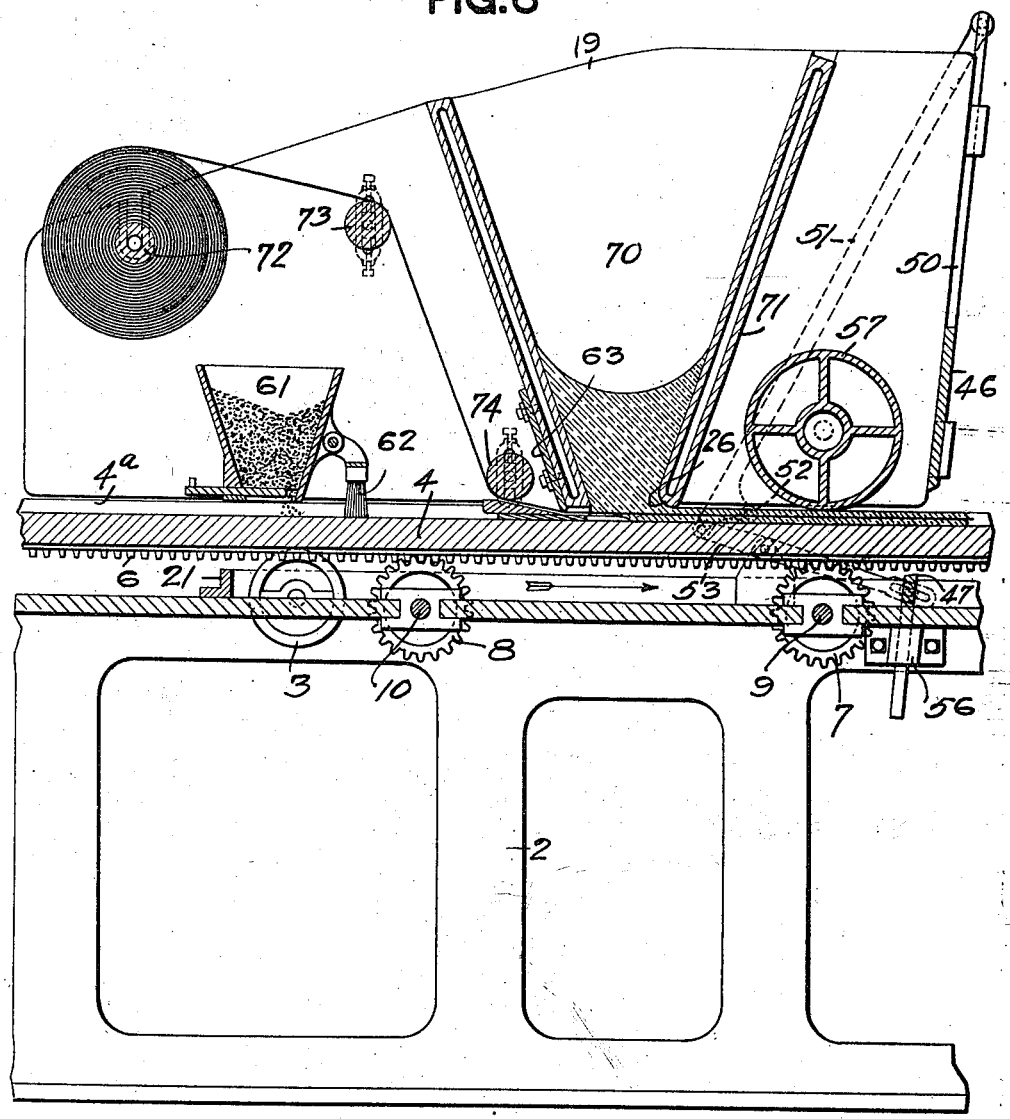
Figure 7:
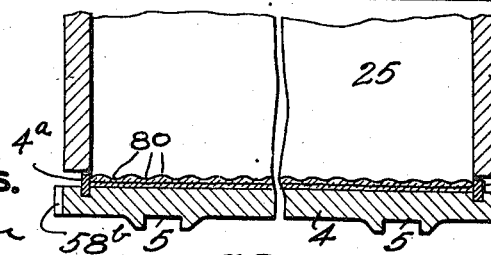

In the accompanying drawings, Figure 1 is a side elevation of our improved apparatus; Fig. 2 is a plan view thereof; Fig. 3 is an enlarged longitudinal section partly broken away; Fig. 4 is an enlarged cross section on the line 4—4 Fig. 3; Fig. 5 is a side view of a portion of the table and the receptacle containing the glass; Fig. 6 is a modified form of our invention; and Fig. 7 is a modified form of leveler.

In the drawings the numeral 2 designates a suitable frame or support having the idle rollers 3 journaled therein at intervals. The table 4 is mounted on said rollers, said table having the guide-ways 5 with which said rollers engage. To provide for the movement of the table 4, said table is provided with the rack 6 with which the pinions 7 and 8 are adapted to engage. These pinions 7 and 8 are mounted on the shafts 9 and 10 which are mounted in suitable bearings in the frame 2 and at the outer ends of said shafts are the bevel-pinions 11 and 12 which mesh with the bevel-pinions 13 and 14. The shafts 15 and 16 are connected up to any suitable source of power and said shafts are provided with the clutches 17 and 18 which are adapted to be thrown into engagement with the bevel-pinions 13 and 14. In this manner provision is made for driving the shafts 9 and 10 independently of each other, and for moving the table back and forth. The table 4 is provided with the removable side strips 4ª which regulate the thickness of the glass and said strips may be readily removed and others substituted according to the desired thickness of the sheets.

The carriage 19 is provided with the wheels 20 which are adapted to engage the circular track 21 supported on the frame 2. The carriage 19 is divided into two hoppers or guns 20ª and 20ᵇ formed by the water-cooled plates 22, 23, 24 and 25. These plates are connected up by suitable flexible connections with a water-supply, whereby circulation is maintained through said plates for cooling the same. The plates 23 of the hopper 20ª and the plate 25 of the hopper 20ᵇ form the levelers or distributers for the glass upon the table and the lower ends of said plates are rounded or beveled as at 26 so as to present suitable edges for leveling the glass as the table is advanced. The plates 23 and 25 are made adjustable so as to provide for making plates of different thicknesses and to provide for this adjustment, the edges of plates 23 and 25 are provided with the pins or studs 27 which engage the blocks 28 moving in the slots 29 of the pass 30 formed on the side walls of the carriage 19. Set-screws 31 and 32 engage the pass 30 at opposite ends and engage opposite sides of the blocks 28 so that by the adjustment of said screws 31 and 32 the plates 23 and 25 may be adjusted at any desired height with great accuracy.

The plates 23 and 24 of the hoppers form the compartment 33. Supported within the compartment 33 at the upper end thereof is the wire-reel 34 which has its bearing in the slots 35 in the sides of the carriage 19. A guard 36 is hinged at 37 to the plate 24, and said guard bears upon the wire 38 which is reeled on the reel 34 and prevents the buckling of the same. The wire passes down through the guide 39 and passes between the rollers 40 and 41. The roller 41 is driven in the direction of the arrow. The said roller is provided with a spur gear 41$^a$ which meshes with the intermediate gear wheel 41$^b$ which is driven by the gear 41$^c$ on the roller 42. To drive the roll 42 a vertical shaft 58 journaled in suitable bearings has the gear 58$^a$ which meshes with the rack 58$^b$ on the table 4. A bevel-pinion 58$^c$ meshes with the bevel-pinion 58$^d$ on the shaft 58$^e$ of the roll. As the table is moved it is apparent that the roll 42 will be rotated. The wire passes under the roller 42 and is connected to the end of the table 4. An idle roll 42$^a$ is situated in the space 43 just in front of the leveler 23 which is adapted to move in contact with the glass and prevent buckling of same at this point. Any suitable clamping device may be employed for securing the wire to the table 4 that shown consisting of the bars 43 and 43$^a$ between which the wire is held. The bar 43 is moved to and fro by means of the clamp 44 operated by the handle 45. Any suitable clamping device, however, may be employed for this purpose.

In order to cut the wire at the desired point when the plate is formed on the table, we employ the knives 46 and 47. The knife 46 is mounted in the slots 48 in the side walls of the carriage 19, and said knife is provided with the pins 49 which engage said slots. Links 50 are connected to the pins 49 and connected to the upper ends of said links are the arms 51. These arms 51 have the rollers 52 which are adapted to travel in contact with the table 4. Pivoted to the lower end of the arms 51 are the arms 53 with slots 54 with which pins on the lower knife 47 are adapted to engage. This lower knife 47 moves in guide 56 on the frame. It is apparent when the rollers 52 leave the table said table moves past said rollers, said rollers will drop and through the movement of the arms 51 and 53, the upper knife 46 will be lowered and the lower knife 47 raised so as to cut the wire at that point.

Mounted on the carriage 19 is the idle roller 57, which moves in contact with the upper surface of the glass on the table, and in front of said roller 57 is the power-driven roller 58 which is driven by any suitable independent source of power in the opposite direction from the roller 57. This roller 58 may be formed of suitable material, a highly polished steel roll being suitable for the purpose, as the purpose of said roller is to give a finish to the glass on the table. The purpose of the roller 57 is simply to prevent the buckling or rising of the glass, and it is not necessary to drive said roll by power, other than the frictional contact of the glass therewith.

Seated above the roll 58 is the hopper 59 which is adapted to contain charcoal or other suitable material which is delivered onto the surface of the roll 58. A brush 60 is connected to the hopper and the brush bears against the face of the roll 58 so as to distribute the charcoal evenly thereon, said charcoal being for the purpose of preventing the glass from sticking to the roll 58. A hopper 61 is carried at the opposite end of the carriage 19, said hopper containing the charcoal which is distributed on the table by means of the brush 62 for the purpose of preventing the glass from adhering to the top of said table.

Screwed to the plate 24 is the gage 63 which is adjustable by means of the slots 64 and bolts 65. This gage regulates the height at which the wire is fed and by adjusting said gage the height of the wire may be varied as desired.

In the manufacture of wire-glass with our improved machine the operations are as follows: The table 4 is advanced until its forward end reaches the leveler 23, whereupon the batch of molten glass is poured from a ladle into the hopper 20$^b$. It will be learned by experience just how much glass will be needed for the size and thickness of sheet to be formed and the amount of glass necessary for the lower layer will be measured accurately and deposited in the hopper 20$^a$. With the molten glass in the hopper 20$^a$ and the table moving in the direction of the arrow Fig. 3. the leveler or distributer 23 will level and distribute the glass on the table as said table advances and when the table reaches the free end of the wire 38, the wire will be clamped to the end of the table by means of the clamp 42 and the movement of the table continues. The wire is laid by the roller 42 onto the sheet of glass on the table and the height of the wire is controlled by the gage 63. The table advances and when the forward end of said table reaches the leveler 25, the batch of molten glass in the hopper 20$^b$ drops onto the first layer of glass, and as the table continues to move forward the leveler 25 will level and distribute the glass from the hopper 20$^b$ upon the wire and the lower layer of glass by which it is carried so that the wire will be embedded equally between the upper and lower layer of glass. The glass in the second hopper will follow the glass from the first hopper so closely that the second sheet will adhere to the first sheet before it has time to chill, thereby giving a homogeneous sheet of glass free from bubbles or other imperfections. The table will continue to move forwardly the rolls 57 and 58 acting on the upper surface of the glass to straighten and polish same, and when the table has advanced so that the rear end passes the leveler 25, the glass in both hoppers will have been exhausted and the finished plate will then be carried by the table to a proper distance beyond the carriage 19 when the plate will be removed from said table the clamping device 42 being first released. Before this, however, the wire is cut by the rollers 52 dropping from the table 4 which operates the knives 46 and 47 and cuts the wire so that the plate of glass is free to proceed without further feeding of the wire. The finished sheet of glass may be deposited on a conveyer to be carried to the leer. To form the next sheet the carriage 19 is turned with the wheels 20 traveling on the tracks 21 and the position of the ladles from that shown in Fig. 3 is reversed so that when the table moves in the opposite direction, a plate of glass may be formed in exactly the same manner as above described. In this manner there is no loss of time due to the returning of the table, but by the reversal of the carriage a second sheet of glass is formed upon the return movement of the table.

In Fig. 6 we have illustrated a modified form of our invention in which a single hopper 70 is employed with the leveler 71. The wire in this case is carried by the reel 72 and passes over the idle roller 73 down and along the roller 74 whence it passes along the hopper 70 and is secured to the forward end of the table. In this manner one batch of glass is employed and the molten glass in descending onto the table embeds the wire by passing through the meshes of said wire onto the said table and the leveler 71 distributes and levels the glass at proper height above the wire so as to have the wire embedded equally between the body of glass.

In Fig. 7 we have illustrated a portion of a leveler which has the teeth or notches 80 formed therein which will give a corrugated or ribbed effect to the surface of the glass.

It is apparent that plain sheets of glass without wire may be formed by means of our apparatus in the same manner as above described, the only difference being that there will be no provision for the feeding and insertion of the wire. It is furthermore clearly apparent that the wire instead of being fed from a reel may be fed in sheets cut to size and that the construction of the machine may be varied in many particulars without departing from the spirit of our invention.

What we claim is:

1. In apparatus for the manufacture of sheet-glass, the combination of a table, means for feeding the glass thereto, and a transversely arranged non-rotary leveler having its lower edge adjacent to said table to control the final thickness of the layer of glass, said leveler and table movable the one with relation to the other.

2. In apparatus for the manufacture of sheet-glass, the combination of a suitable table, means for feeding the glass thereto, and a transversely arranged adjustable non-rotary leveler having its lower edge adjacent to said table to control the final thickness of the layer of glass, said leveler and table movable the one with relation to the other.

3. In apparatus for the manufacture of sheet glass, the combination of a table, a receptacle for containing the molten glass above said table, and a non-rotary leveler to control the final thickness of the layer of glass, said receptacle and table movable the one with relation to the other.

4. In apparatus for the manufacture of sheet glass, the combination of a table, means for feeding the glass thereto, a receptacle above said table for containing molten glass, and a transverse non-rotary leveler forming one of the walls of said receptacle, said receptacle and table movable the one with relation to the other.

5. In apparatus for the manufacture of sheet-glass, the combination of a table, means for moving said table, means for supporting a wire-mesh at a suitable height above the surface of said table, a receptacle above said table for containing molten glass, and a transverse non-rotary leveler.

6. In apparatus for the manufacture of sheet-glass, the combination of a table, means for moving said table, means for securing wire-mesh to said table and supported at a distance from the surface thereof, a receptacle for containing a supply of molten glass, a transverse non-rotary leveler connected to said receptacle, a second receptacle containing a supply of molten glass, and a second transverse non-rotary leveler with its lower edge above the lower edge of said first named leveler.

7. In apparatus for the manufacture of sheet-glass, the combination of a table, means for moving same, means for connecting the wire-mesh to said table, a receptacle above said table for containing a supply of molten glass, a transverse non-rotary leveler, a second receptacle, a second transverse non-rotary leveler, the lower edge of second leveler being above the lower edge of said first leveler, and means for feeding the wire mesh between said receptacles.

8. In apparatus for the manufacture of sheet-glass, the combination of a table, means for moving same, means for attaching the wire mesh thereto, a receptacle above said table for containing molten glass, a transverse non-rotary leveler, a second receptacle containing molten glass, a second transverse non-rotary leveler, the lower edge of said last named leveler being above the lower edge of said first named leveler, means between said receptacles for conveying the wire mesh, and cutting mechanism between said receptacles for severing the wire mesh.

9. In apparatus for the manufacture of sheet-glass, the combination of a table, means for moving the same, means for attaching the wire-mesh thereto, a receptacle above said table for containing molten glass, a transverse non-rotary leveler, a second receptacle containing molten glass, a second transverse non-rotary leveler, the lower edge of said last named leveler being above the lower edge of said first named leveler, means between said receptacles for feeding the wire-mesh, and automatic cutting mechanism between said receptacles for severing the wire-mesh.

10. In apparatus for the manufacture of sheet-glass, the combination of a table, means for moving the same, means for securing the wire-mesh thereto, a receptacle above said table for containing molten glass, a transverse non-rotary leveler, a second receptacle for containing molten glass, a second transverse non-rotary leveler, the lower edge of said last named leveler being above the lower edge of said first named leveler, means for feeding the wire mesh in the space between said receptacles, a driven roller engaging said wire-mesh, and an idle roller working in connection with said driven roller.

11. In apparatus for the manufacture of sheet-glass, the combination of a table, means for moving same, a receptacle above said table for containing molten glass, a transverse leveler, a reel for containing wire-mesh, means for securing the wire-mesh to said table, and a swinging guard engaging the wire mesh on said reel.

12. In apparatus for the manufacture of sheet-glass, the combination of a table, means for moving said table to and fro, a receptacle above said table for containing molten glass, a transverse leveler, and means for reversing the position of said receptacle with reference to said table.

13. In apparatus for the manufacture of sheet glass, the combination of a table, means for moving said table to and fro, a carriage, and circular track on which said carriage is mounted, a receptacle on said carriage for containing the molten glass, and a transverse leveler.

14. In apparatus for the manufacture of sheet glass, the combination of a table, means for feeding the glass thereto, a transversely arranged non-rotary leveler, and a polishing roll in front of said leveler.

15. In apparatus for the manufacture of sheet-glass, the combination of a table, means for moving the same, means for securing the wire-mesh thereto, means for feeding molten glass to said table, means for leveling said glass thereon, an upper and lower cutting knife for severing the wire-mesh, an arm supported by said table, connections between said arm and said knives, and means for operating said knives by the disengagement of said arm from said table.

16. In apparatus for the manufacture of sheet-glass, the combination of a table, means for moving same, means for securing the wire-mesh thereto, means for supplying molten glass to said table, means for leveling said glass thereon, an upper and lower cutting knife severing said wire-mesh, an arm, a roller on said arm engaging said table, connections between said arm and the upper and lower knife, and means for operating said knives by the disengagement of said roller from said table.

17. In apparatus for the manufacture of sheet-glass, the combination of a table, means for feeding glass thereto, and a transversely arranged non-rotary leveler having its lower edge serrated and adjacent to said table, said table and leveler movable the one with relation to the other.

In testimony whereof, we the said FERNAND M. FRANCART, GEORGE C. DEBAY, JAMES W. JOHNSTON and GEORGE B. COUCH have hereunto set our hands.

FERNAND M. FRANCART.
GEORGE C. DEBAY.
JAMES W. JOHNSTON.
GEORGE B. COUCH.

Witnesses:
ROBT. D. TOTTEN,
ROBERT C. TOTTEN.